(No Model.)

G. W. BAKER.
THREAD CUTTING ATTACHMENT FOR SEWING MACHINES.

No. 500,092. Patented June 20, 1893.

Witnesses.
E. B. Gilchrist

Inventor.
George W. Baker

UNITED STATES PATENT OFFICE.

GEORGE W. BAKER, OF CLEVELAND, OHIO, ASSIGNOR TO THE WHITE SEWING MACHINE COMPANY, OF SAME PLACE.

THREAD-CUTTING ATTACHMENT FOR SEWING-MACHINES.

SPECIFICATION forming part of Letters Patent No. 500,092, dated June 20, 1893.

Application filed March 16, 1893. Serial No. 466,241. (No model.)

*To all whom it may concern:*

Be it known that I, GEORGE W. BAKER, of Cleveland, in the county of Cuyahoga and State of Ohio, have invented certain new and useful Improvements in Thread-Cutting Attachments for Sewing-Machines; and I do hereby declare the following to be a full, clear, and exact description of the invention, such as will enable others skilled in the art to which it pertains to make and use the same.

My invention relates to improvements in thread-cutting attachments for sewing-machines; and it consists in certain features of construction and combination of parts hereinafter described and pointed out in the claim.

Figure 1:
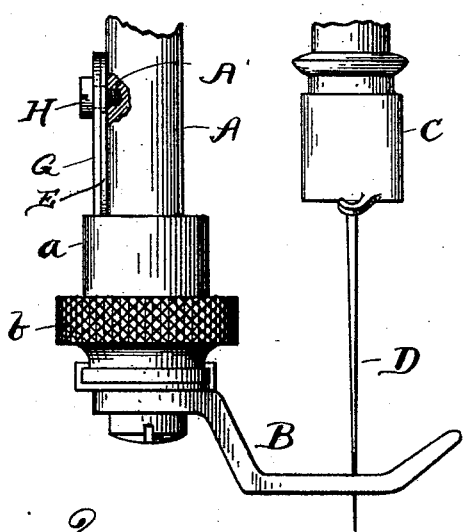
Figures 2, 3:
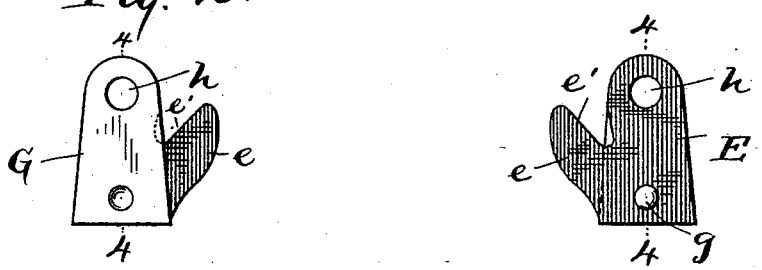
Figure 4:
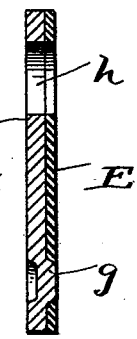

In the accompanying drawings, Figure 1 is an outer side elevation, partly in section, of the lower portion of the presser-bar and needle-bar of a sewing-machine provided, respectively, with the presser-foot and needle, showing my improved thread-cutting attachment in position. Fig. 2 shows an outer side elevation of the thread-cutting attachment. Fig. 3 shows an inner side elevation of the same. Fig. 4 is an enlarged view in section on line 4—4, Figs. 2 and 3.

Referring to the drawings, A represents the presser-bar of a sewing-machine; B the presser-foot; C the needle-bar, and D the needle.

$b$ represents the nut that secures the presser-foot upon the presser-bar and $a$ represents a collar rigidly mounted upon the presser-bar above nut $b$.

E represents the cutter-plate that is composed, preferably, of thin hardened steel, said plate being provided with an outwardly and preferably upwardly-projecting arm, $e$, that, at the top, is provided with a cutting-edge, $e'$. The cutter-plate is suitably secured to an upright plate, G, preferably as more clearly shown in Fig. 4, wherein a lug or projection $g$, is formed upon the inner side of the supporting-plate and engages a corresponding hole in the cutter-plate. The supporting-plate rests upon collar $a$ and near its upper end is suitably secured, preferably by means of a screw, H, to the presser-bar, the cutter-plate and its supporting-plate being perforated, as at $h$, for the passage of said screw, and the presser bar being provided with a screw-threaded hole, A', for receiving said screw.

The cutter-plate preferably corresponds in size with its supporting-plate, so that the edges of said plates come flush with each other and so that the cutter-plate also rests upon collar $a$ of the presser-bar.

By the construction hereinbefore described, it will be observed that the cutter-plate is rigidly held between its supporting-plate and the presser-bar.

When the operator desires to cut or sever his thread, he takes the same in hand and pulls it over the cutting-edge of the cutter and severs the same.

The simplicity and economy of the construction hereinbefore described constitute the merits of my invention.

What I claim is—

The combination with a presser-bar of a sewing-machine and a collar, $a$, upon said bar, of a thread-cutting attachment comprising an upright plate, G, and an upright cutter-plate E secured to plate G, the latter having a lateral lug or projection $g$ and the cutter-plate being forced upon said lug or projection against the adjacent side of the supporting-plate, the thread-cutting attachment resting upon the aforesaid collar and being removably secured to the presser-bar and the cutter-plate of the attachment having a projecting arm or member provided with a cutting-edge, all substantially as shown and described.

In testimony whereof I sign this specification, in the presence of two witnesses, this 22d day of February, 1893.

GEORGE W. BAKER.

Witnesses:
CHAS. D. GREAR, Jr.,
JOHN. D. WARE.